3,843,556
PREPARATION OF ALKALINE EARTH METAL HALOPHOSPHATE PHOSPHORS
Armand J. Panson and Roswell J. Ruka, Pittsburgh, Pa., assignors to Westinghouse Electric Corporation, Pittsburgh, Pa.
No Drawing. Continuation of application Ser. No. 71,204, Sept. 10, 1970. This application Dec. 19, 1972, Ser. No. 316,638
Int. Cl. C09k 1/36
U.S. Cl. 252—301.6 P          8 Claims

ABSTRACT OF THE DISCLOSURE

A method is detailed for preparing alkaline earth metal halophosphate phosphors by first precipitating an activator doped alkaline-earth metal halogen-phosphate with apatite crystal structure. A first solution is prepared essentially containing the alkaline-earth metal constituent, and a second solution essentially containing phosphate radical. The halogen constituents are chlorine and fluorine, and when chlorine is the halogen, it can be included in either the first or second solution, but if fluorine is the halogen it is included in the second solution. Selected metallic activating constituents are included in one or both of the solutions. The solutions are admixed and heated while maintaining the pH of the resulting mixture at a value of from about 2 to 7. The apatite structured, activator doped alkaline-earth metal halogen-phosphate is thus precipitated. The precipitate is separated from the resulting solution and heated to optimize its luminescence.

This is a continuation, of application Ser. No. 71,204 filed Sept. 10, 1970, now abandoned.

BACKGROUND OF THE INVENTION

Alkaline earth metal halophosphate phosphors have been the standard fluorescent lamp phosphor for over twenty years. The lumen output of the halophosphate phosphor has been constantly improved by various processing techniques; however, the basic preparation remains the same, and consists of a solid-state firing of raw mixed constituents to form and activate the halophosphate phosphor.

The solid-state firing technique is a time consuming and a less than ideal procedure. The resultant product of this standard preparation can be of varying quality because of the inherent problems associated with solid-state transport mechanisms during the formation of the halophosphate.

Attempts at preparing the basic halophosphate matrix by precipitation have met with mixed results. In U.S. Pat. No. 3,538,014, issued Nov. 3, 1970, owned by the assignee of the present invention, is disclosed a method of producing activated calcium halogen phosphate by a precipitation process. This process involved disposing the calcium and activator metal constituents in a basic solution, and the phosphate radical in an acidic solution. The solutions were then admixed with an ammoniacal calcium chloride solution to raise the pH of the solution to thereby precipitate the alkaline earth metal halogen phosphate. In copending application, S.N. 109,988, filed Jan. 26, 1971, now U.S. Pat. No. 3,694,371 issued Sept. 26, 1972, filed concurrently by the present inventors and owned by the assignee of the present invention a homogeneous precipitation technique for preparing halophosphate is disclosed.

SUMMARY OF THE INVENTION

A superior method of efficiently producing alkaline-earth metal halophosphate phosphor has been discovered. The method comprises separately preparing a first solution essentially containing alkaline-earth metal, and preparing a second solution essentially containing phosphate radical. If chlorine is the halogen utilized it can be included in either, or both of the first and second solutions, but if fluorine is used it is included in the second solution. Selected metallic activator constituents can be included in both of these solutions or in either one. The amount of phosphate radical is at least such as to react completely with about 90% of the total alkaline-earth metal and activator metal to form the orthophosphate. The chlorine and/or fluorine is present in an amount sufficient to react with substantially all the remaining alkaline-earth metal. The phosphate radical and halogen can be included in excess over the amounts required to form the halo-apatite. The pH value of the foregoing solutions are determined with the requirement of keeping these essential constituents suspended in solution, and of precipitating an apatite structured compound. The solutions are heated to a boil and admixed while maintaining the pH of the resulting mixture at a predetermined value of from about 2 to 6. An apatite structured, activator doped alkaline-earth metal halogen-phosphate is thereby precipitated. The precipitate is then separated from the resulting mixture, and heated to optimize its luminescence.

It has been found that when the precipitating solution contains fluorine, and chlorine, only the fluorine will be incorporated into the precipitated halogen-phosphate. The structure of the precipitate is then fluorapatite. Since it is generally preferable that the final phosphor be a fluoro-chloro-apatite, a predetermined amount of chlorine can be added to the precipitated fluorapatite, by for example adding a predetermined amount of ammonium chloride to the precipitate and then firing the mixture. This can also be achieved by providing a chlorine atmosphere during the final heating or firing step.

It has been discovered that when the precipitating solution contains only chlorine the resultant precipitate is a chlorine containing hydroxyapatite. This can be readily converted to chloro-apatite by heating. If it is desired to form a fluoro-chloro-apatite, one can treat the precipitate with a fluorine containing acid solution to convert the chlorine containing hydroxyapatite to a fluoro-chloro-apatite.

The pH value of the resulting mixture can be widely varied within a range of from about 2 to 7, with changes in pH value affecting the crystal habit and particle size of the resulting precipitate. The upper limit of the pH value of about 7 is a result of the requirement to keep all the essential constituents suspended in solution until the formation of the desired metal activator doped, apatite structured, alkaline-earth metal halogen-phosphate.

DESCRIPTION OF THE PREFERRED EMBODIMENTS

The method of the present invention can be best understood by reference to an exemplary preparation. A first solution is prepared by mixing about 250 milliliters of a 1 molar calcium acetate solution (filtered), and 11 milliliters of a 0.5 molar manganese chloride solution. About 0.78 grams of cadmium acetate dihydrate is mixed in the above mixture, and concentrated acetic acid is mixed in to adjust the pH to a value of about 5.

A second solution is prepared from 225 milliliters of a 2 molar solution of diammonium phosphate (filtered), about 1.85 grams of ammonium fluoride first dissolved in about 10 milliliters of distilled water, and 0.57 grams of potassium antimony tartrate. The pH of this second solution is adjusted to about 5 also.

The first and second solutions are each heated preferably to boiling, and are simultaneously added together in a separate container, with continued heating at a boil and vigorous stirring for about an hour. A white precipitate is formed, which is manganese, antimony, and cadmium doped calcium fluorapatite. The final pH in the above example is about 4.5; if desired ammonium hydroxide may be added while mixing to control the final pH. This would be desirable if the reactants were used at a lower initial pH. The precipitate is separated from the solution and dried by heating for example at about 160° C. for one hour. The precipitate is then heated in an inert atmosphere such as argon at from about 900° C.–1200° C. for a time sufficient to optimize the luminescence of the material, with the higher the temperature the shorter the firing time. Several weight percent of ammonium chloride is mixed with the precipitate before firing to provide a fluoro-chloro-apatite phosphor.

The preferred halophosphate phosphor composition has an approximate atom ratio of fluorine to chlorine of 9:1. It has been found that a convenient way to arrive at this ratio is to first precipitate chlorinated hydroxyapatite. Then, one either directly adds the requisite fluorine by adding ammonium fluoride to the precipitate containing solutions, or first separating the precipitate and then adding it to an aqueous solution containing the requisite amount of fluorine. The fluorine solution is conveniently provided by dissolving ammonium fluoride in distilled water.

In precipitating a chlorinated hydroxyapatite the exemplary embodiment is followed but ammonium fluoride is substituted for by ammonium chloride and the initial pH of the precipitating solution is greater than about 6, with the resultant pH being maintained at a value greater than about 4. The precipitate can be converted to a fluoro-chloro-apatite by directly adding ammonium fluoride to the hydroxyapatite containing solution with continued heating and stirring. The fluorine will replace the hydroxyl radical to provide a fluoro-chloro-apatite. Alternatively the chlorinated hydroxy-apatite is separated from the precipitating solution and is slurried with ammonium fluoride dissolved in a convenient amount of distilled water to convert the product to a fluoro-chloro-apatite. The molar amount of fluoride added is an amount at least sufficient to satisfy the apatite formulation with some excess being desirable.

It is generally desired that the final phosphor product be a fluoro-chloro-apatite. Thus, when the fluor-apatite is precipitated it is necessary to incorporate an amount of chlorine. This can be accomplished by heating the precipitate in the presence of chlorine to provide the fluoro-chloro-apatite with the desired fluorine to chlorine atom ratio. This can be conveniently done by admixing several weight percent of ammonium chloride with the precipitate and then heating to optimize the luminescence.

In practicing the precipitation process of the present invention it has been found useful to include an amount of acetate ion in the precipitating solution. The acetate acts as a buffering agent to limit the degree of acidity of the precipitating solution during the process. This prevents the pH from getting too low, i.e., to a value less than about 2, below which point the precipitate would largely be acid phosphate. The acetate can be added by using a starting material such as calcium acetate or by adding an amount of acetic acid.

In practicing the method it has been found that the presence of fluorine with the calcium prior to the mixture of the first and second solutions results in the formation of calcium fluoride which is not readily soluble. Thus, the fluorine should be kept separate from the calcium until the final step of the process. Since calcium chloride is readily soluble no such problem is presented with respect to the calcium and chlorine.

It has also been discovered that when fluorine and chlorine are both included in the precipitating solution, the fluorine is preferentially included in the precipitate, and the precipitate will consist of fluorapatite. Thus, when the desired halophosphate phosphor product is a fluoro-chloro-apatite, it is necessary to first precipitate an apatite structured fluorine or chlorine containing phosphate, and then to incorporate the other element before or during the heating step which optimizes luminescence. When the precipitating solutions contain only chlorine, and fluorine is excluded therefrom, the resulting precipitate will be a chlorine containing hydroxy apatite. Again, when a fluoro-chloro-apatite is desired as the phosphor material, fluorine must be thereafter added to the precipitate. It has been found convenient to incorporate the fluorine with the chlorine containing hydroxyapatite by treating this hydroxyapatite with a fluoride containing acid solution to convert the precipitate to fluoro-chloro-apatite prior to the heating step which optimizes luminescence.

The following is an example of a preparation in which chlorine is incorporated into the precipitate by first precipitating manganese and antimony activated chlorinated hydroxyapatite and then reacting the precipitate with a fluoride solution to convert to chlorinated fluorapatite. A first solution is prepared by mixing about 250 milliliters of a 1 molar calcium acetate solution (filtered), and 11 milliliters of a 0.5 molar manganese chloride solution. Thirty grams of ammonium chloride and about 0.78 grams of cadmium acetate dihydrate is mixed in the above mixture, and concentrated acetic acid is mixed in to adjust the pH to a value of about 6.

A second solution is prepared from 225 milliliters of a 1 molar solution of diammonium phosphate (filtered), about 30 grams of ammonium chloride, and 0.57 grams of potassium antimony tartrate. The pH of this second solution is adjusted to about 6 also.

The first and second solutions are each heated preferably to boiling, and are simultaneously added together to a separate container, with continued heating at a boil and vigorous stirring for about an hour. A white precipitate is formed which is manganese, antimony and cadmium doped chlorinated hydroxyapatite. The final pH is about 5.2. The precipitate is then fluoridated by adding about 1.67 grams of ammonium fluoride dissolved in about 25 ml. of water to the reaction mixture which is then stirred for about two hours at around 85° C. The fluoridated precipitate is then separated, washed and dried as before, and then heated in an inert atmosphere such as argon at about 900–1200° C. for a time sufficient to optimize the luminescence of the material.

In precipitating the chlorinated hydroxyapatite, the initial pH should be 6 or greater, with the final, or resultant pH maintained at greater than pH 4.

The method of the present invention can be practiced with other metallic activators for the halophosphate phosphors which can be readily incorporated into the solution. For example, divalent europium activated alkaline-earth metal halophosphate described in copending application Ser. No. 726,464, filed May 3, 1968, and owned by the present assignee, can be prepared by the present method. It is also well known to substitute cadmium and magnesium for the alkaline-earth metals in preparing halophosphate phosphors, and this can be achieved while utilizing the method of the present invention.

What is claimed is:

1. Method of preparing alkaline-earth metal halophosphate phosphor which exhibits the apatite crystal structure, which method comprises:
   (a) separately preparing a first aqueous solution containing as an essential constituent an alkaline-earth metal compound and a second aqueous solution containing as an essential constituent phosphate radical, a metal activator containing compound or compounds being included in one or both of said solutions, the atom ratio of total alkaline-earth metal to total activator metal being substantially that as desired in said phosphor, the amount of phosphate radical being at least such as to react completely with about 90% of the total alkaline-earth metal and activator metal to form an orthophosphate, and chlorine and/or fluorine being present in an amount sufficient to react with substantially all of the remaining alkaline-earth metal, with the pH of said solutions being approximately equal and at a value of from about 5 to 6;
(b) heating each solution to approximately boiling temperature and admixing each while maintaining the pH of the resulting mixture at a value of from about 2 to 7, whereby apatite structured, activator doped alkaline-earth metal halogen-phosphate is precipitated; and
(c) separating said precipitate from said resulting mixture and heating said precipitate to about 900°–1200° C. to optimize its luminescence.

2. The method as specified in claim 1, wherein said metal activators are manganese and antimony, and cadmium is also included in at least one of said solutions.

3. The method as specified in claim 1, wherein an amount of acetate ion is included in the resulting mixture to maintain the pH at a relatively constant value, whereby the precipitation of acid phosphate is prevented.

4. The method as specified in claim 1, wherein said luminescence optimizing heating is in an inert atmosphere with the higher the temperature the shorter the heating time.

5. The method as specified in claim 1, wherein ammonium hydroxide is added to the resulting mixture to maintain the pH value within the desired limits.

6. The method as specified in claim 1, wherein a predetermined amount of chlorine is incorporated into the final phosphor product during said heating step by providing chlorine in the firing atmosphere.

7. The method as specified in claim 1, wherein the initial pH of the admixed resulting mixture is greater than 6, and chlorine is the only halogen present in solution, whereby chlorinated hydroxyapatite is the precipitate, and the resultant pH during the formation of precipitate is maintained greater than pH 4.

8. The method as specified in claim 7, wherein when the desired final phosphor is fluoro-chloro-apatite, said chlorinated hydroxyapatite is treated with a fluorine containing aqueous solution to convert the product to a fluoro-chloro-apatite.

References Cited
UNITED STATES PATENTS

| | | | |
|---|---|---|---|
| 3,575,876 | 4/1971 | Piper | 252—301.4 P |
| 3,538,014 | 11/1970 | Wachtel | 252—301.4 P |
| 3,598,751 | 8/1971 | Frese et al. | 252—301.4 P |

FOREIGN PATENTS

| | | | |
|---|---|---|---|
| 83,992 | 1/1957 | Netherlands | 252—301.4 P |

JACK COOPER, Primary Examiner

U.S. Cl. X.R.

252—301.4 P